United States Patent
Tsubouchi et al.

(10) Patent No.: US 11,776,183 B2
(45) Date of Patent: Oct. 3, 2023

(54) GENERATION DEVICE, GENERATION METHOD, AND NON-TRANSITORY COMPUTER READABLE STORAGE MEDIUM

(71) Applicant: Yahoo Japan Corporation, Tokyo (JP)

(72) Inventors: Kota Tsubouchi, Tokyo (JP); Teruhiko Teraoka, Tokyo (JP); Hidehito Gomi, Tokyo (JP); Junichi Sato, Tokyo (JP)

(73) Assignee: Yahoo Japan Corporation, Tokyo (JP)

( * ) Notice: Subject to any disclaimer, the term of this patent is extended or adjusted under 35 U.S.C. 154(b) by 0 days.

(21) Appl. No.: 17/196,453

(22) Filed: Mar. 9, 2021

(65) Prior Publication Data

US 2022/0020190 A1 Jan. 20, 2022

(30) Foreign Application Priority Data

Mar. 19, 2020 (JP) ................ 2020-050318

(51) Int. Cl.
  *G06T 11/60* (2006.01)
  *G06F 21/62* (2013.01)
  *G06N 20/00* (2019.01)

(52) U.S. Cl.
  CPC .......... *G06T 11/60* (2013.01); *G06F 21/6218* (2013.01); *G06N 20/00* (2019.01); *G06T 2200/24* (2013.01)

(58) Field of Classification Search
  CPC .. G06T 11/60; G06T 2200/24; G06F 21/6218
  See application file for complete search history.

(56) References Cited

U.S. PATENT DOCUMENTS

| 11,120,799 | B1* | 9/2021 | Sundararaman | ...... G06F 40/253 |
| 2004/0030566 | A1* | 2/2004 | Brooks Rix | ........... G06Q 10/10 705/321 |
| 2009/0276457 | A1* | 11/2009 | Carmel | ............... G06F 16/9535 |
| 2010/0332584 | A1* | 12/2010 | Koul | ...................... G06Q 10/06 715/752 |
| 2011/0185342 | A1* | 7/2011 | Argue | .................. H04L 67/125 717/113 |

(Continued)

FOREIGN PATENT DOCUMENTS

JP   6230634 B2   10/2017

OTHER PUBLICATIONS

Unity, "Scene Visibility", Nov. 19, 2019, Unity Technologies. Publication (Year: 2019).*

(Continued)

*Primary Examiner* — YuJang Tswei
(74) *Attorney, Agent, or Firm* — Procopio, Cory, Hargreaves & Savitch LLP

(57) ABSTRACT

A generation device according to the present application includes: an acquisition unit which acquires content targeted for disclosure (for example, an image which a user desires to disclose) and policy information which indicates a disclosure policy of the content (for example, a text which the user inputs as a caption of the image); and a generation unit which generates modified content in which a predetermined part of the content is modified based on the disclosure policy indicated by the policy information (for example, content in which an object identified based on the disclosure policy is emphasized).

15 Claims, 5 Drawing Sheets

(56) References Cited

U.S. PATENT DOCUMENTS

| | | | | |
|---|---|---|---|---|
| 2012/0072969 A1* | 3/2012 | Aratsu | ............... | G06F 21/604 |
| | | | | 726/1 |
| 2015/0278725 A1* | 10/2015 | Mizuta | ............ | G06Q 30/0244 |
| | | | | 705/7.12 |
| 2016/0188181 A1* | 6/2016 | Smith | ............... | G06F 3/048 |
| | | | | 715/765 |
| 2019/0121340 A1* | 4/2019 | Cella | ................ | H04L 1/0041 |
| 2019/0129407 A1* | 5/2019 | Cella | ................ | H04L 1/0002 |
| 2019/0384870 A1* | 12/2019 | Shiraishi | ............. | G06F 30/20 |
| 2022/0100154 A1* | 3/2022 | Takahashi | ........... | G06N 20/00 |

OTHER PUBLICATIONS

P. Garrido, L. Valgaerts, H. Sarmadi1, I. Steiner, K. Varanasi, P. Pérez, C. Theobalt), ("VDub: Modifying Face Video of Actors for Plausible Visual Alignment to a Dubbed Audio Track", 2015, The Eurographics Association and John Wiley & Sons Ltd. (Year: 2015).*

Peng-Yeng Yin, Bir Bhanu, Fellow, "Integrating Relevance Feedback Techniques for Image Retrieval Using Reinforcement Learning", 2005, IEEE (Year: 2005).*

M. Hanmandlu* and Anirban Das, "Content-based Image Retrieval by Information Theoretic Measure", 2011, DESIDOC (Year: 2011).*

* cited by examiner

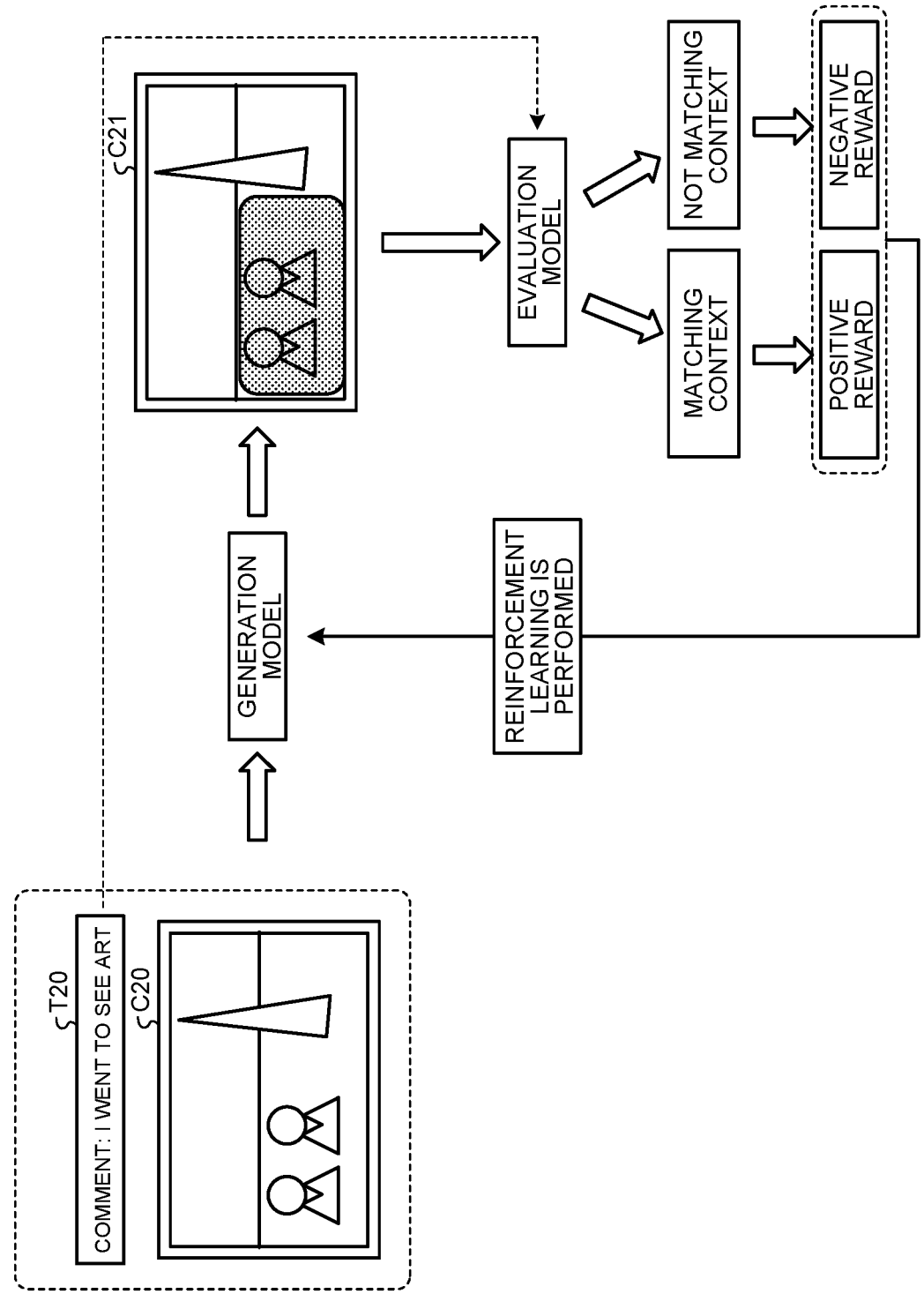

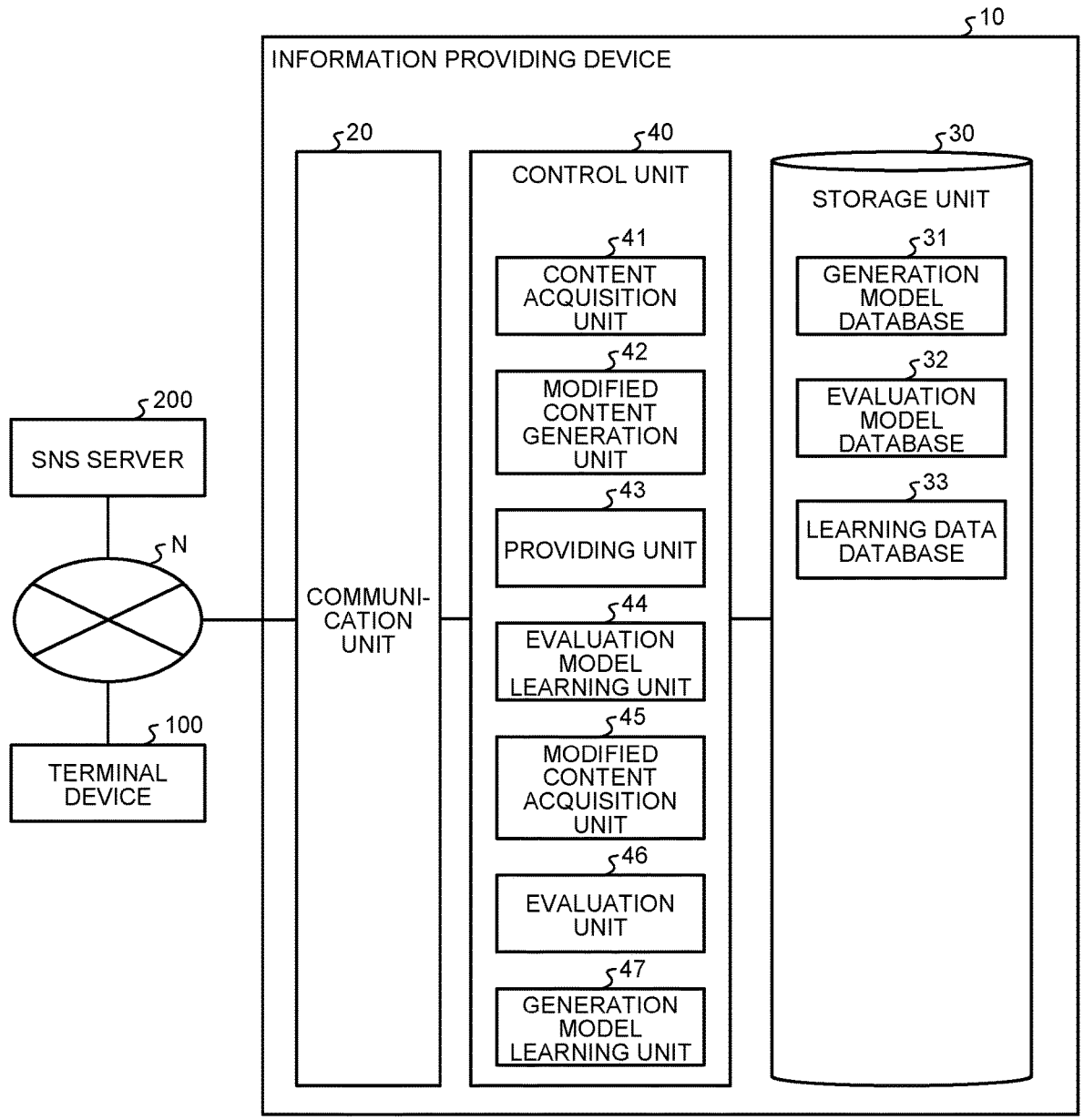

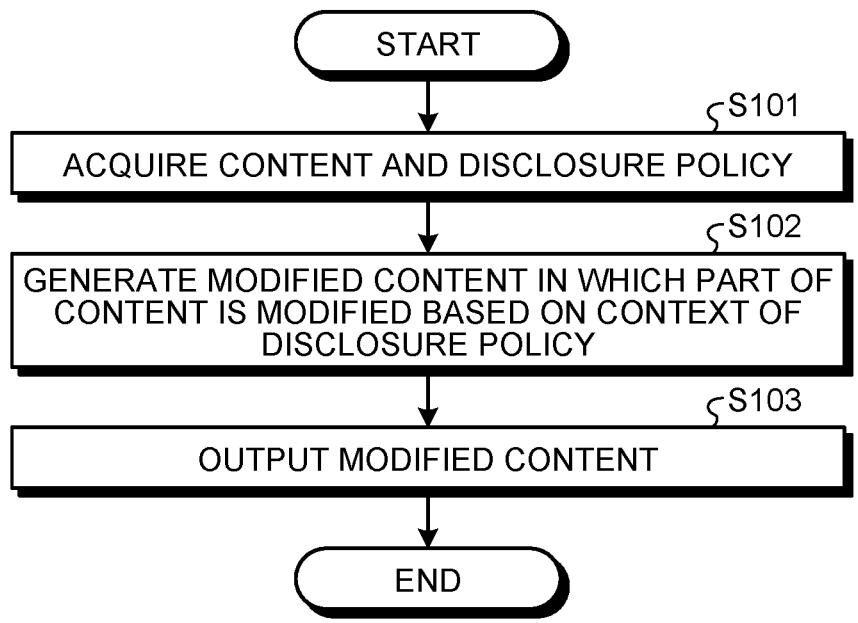
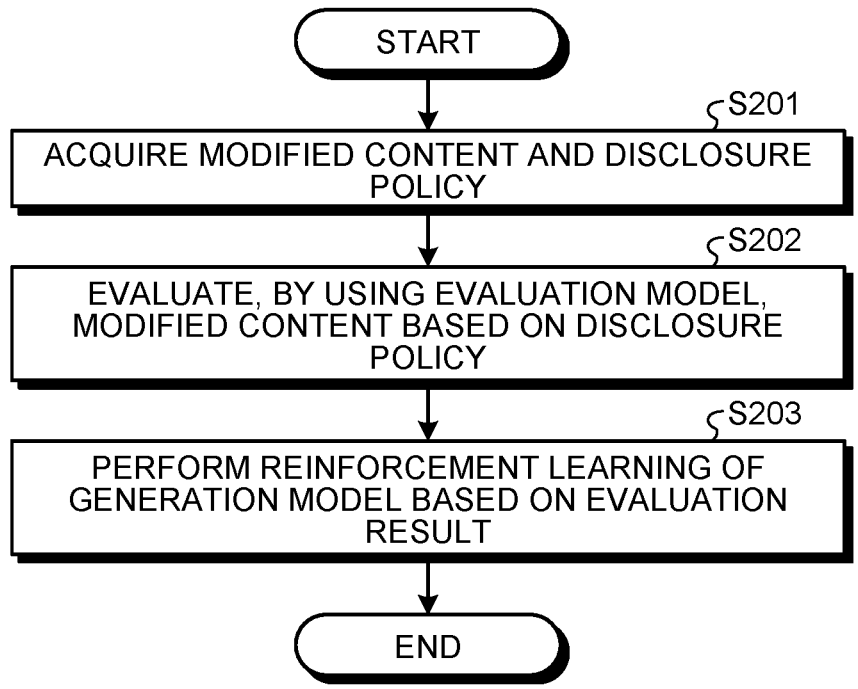

GENERATION DEVICE, GENERATION METHOD, AND NON-TRANSITORY COMPUTER READABLE STORAGE MEDIUM

CROSS-REFERENCE TO RELATED APPLICATION(S)

The present application claims priority to and incorporates by reference the entire contents of Japanese Patent Application No. 2020-050318 filed in Japan on Mar. 19, 2020.

BACKGROUND OF THE INVENTION

1. Field of the Invention

The present invention relates to a generation device, a generation method, and a non-transitory computer readable storage medium.

2. Description of the Related Art

Conventionally, there have been proposed technologies relating to image processing, in each of which an object such as a person which is included in an image is recognized. As one example of the above-mentioned technologies, there has been known a technology in which based on a plurality of pieces of feature area information which includes feature area information extracted based on an image and feature area information extracted based on text information relating to the image, a processed image is generated from the image.

However, there may be a case where it cannot be said that appropriate content is generated.

For example, in the above-mentioned technology, based on a topic extracted from text information of a news article by a morphological analysis or the like, a processed image is merely generated from an image of the news article, and there may be a case where a context of the news article is not reflected in the processed image, and there may be a case where it cannot be said that appropriate content is generated.

SUMMARY OF THE INVENTION

It is an object of the present invention to at least partially solve the problems in the conventional technology.

A generation device according to the present application includes an acquisition unit which acquires content targeted for disclosure and policy information which indicates a disclosure policy of the content and a generation unit which generates modified content in which a predetermined part of the content is modified based on the disclosure policy indicated by the policy information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a diagram illustrating one example of processing using a generation model and an evaluation model according to an embodiment;

FIG. 3 is a diagram illustrating a configuration example of an information providing device according to the embodiment;

FIG. 4 is a diagram illustrating one example of a learning data database according to an embodiment;

FIG. 5 is a flowchart illustrating one example of a procedure of the generation processing according to the embodiment;

FIG. 6 is a flowchart illustrating one example of a procedure of learning processing according to an embodiment.

DETAILED DESCRIPTION OF THE PREFERRED EMBODIMENTS

Hereinafter, with reference to the accompanying drawings, modes (hereinafter, referred to as "embodiments") for implementing a generation device, a generation method, and a non-transitory computer readable storage medium according to the present application will be described in detail. Note that the generation device, the generation method, and the non-transitory computer readable storage medium according to the present application are not limited by the embodiments. In addition, in the each embodiment described below, the same components are denoted by the same reference signs and overlapping description is omitted.

1. Embodiments

Figure 1:
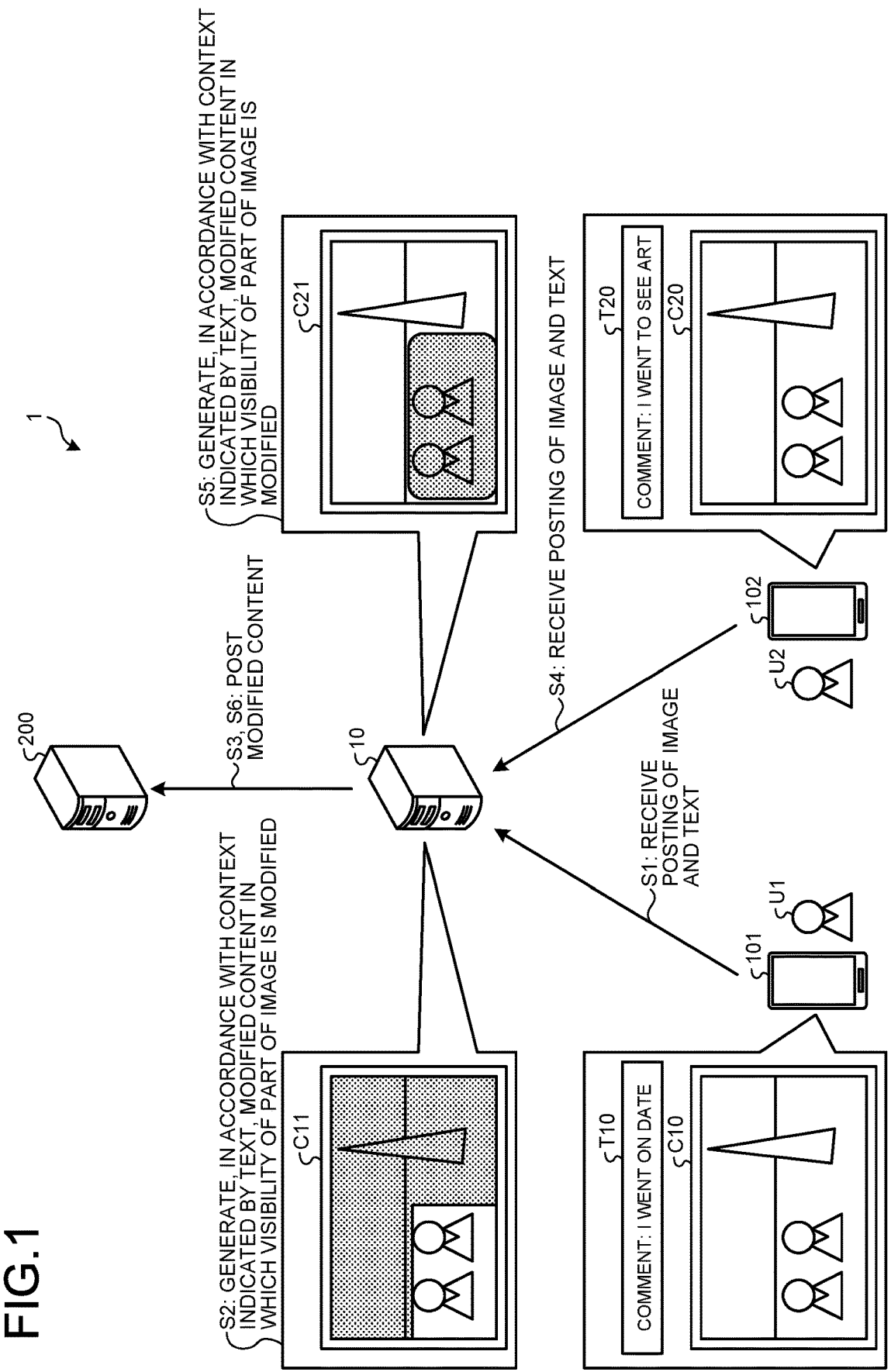
FIG. 1 is a diagram illustrating one example of generation processing according to an embodiment.

With reference to FIG. 1, generation processing realized by the generation device and the like in the present embodiment will be described. FIG. 1 is a diagram illustrating one example of the generation processing according to the embodiment. Note that in FIG. 1, it is assumed that the generation processing and the like according to the embodiment is realized by an information providing device 10 which is one example of the generation device according to the present application.

As illustrated in FIG. 1, a generation system 1 according to an embodiment includes the information providing device 10, a terminal device 101, a terminal device 102 (hereinafter, there may be a case where the terminal device 101 and the terminal device 102 are collectively referred to as a "terminal device 100"), and a social network service (SNS) server 200. The information providing device 10, the terminal device 100, and the SNS server 200 are mutually communicably connected via a network N (for example, see FIG. 2) in a wired or wireless manner. The network N is, for example, a wide area network (WAN) such as the Internet. Note that the generation system 1 illustrated in FIG. 1 may include a plurality of information providing devices 10, a plurality of terminal devices 100, and a plurality of SNS servers 200.

The information providing device 10 illustrated in FIG. 1 is an information processing device which performs the generation processing and is realized by, for example, a server device, a cloud system, or the like. In an example in FIG. 1, the information providing device 10 generates modified content in which a predetermined part of content received from a user is modified.

The terminal device 100 illustrated in FIG. 1 is an information processing device used by a user. For example, the terminal device 100 is realized by a smartphone, a tablet-type terminal, a notebook-type personal computer (PC), a desktop-type PC, a mobile phone, a personal digital assistant (PDA), or the like. In addition, the terminal device 100 displays information delivered by the information providing device 10 and the SNS server 200 by a web browser or an application. Note that in the example illustrated in FIG. 1, a case where the terminal device 100 is the smartphone is illustrated.

In addition, when the terminal device 100 has received control information which realizes predetermined information processing from the information providing device 10 or the SNS server 200, the terminal device 100 realizes the information processing in accordance with the control information. Here, the control information is described by, for example, a script language such as JavaScript (registered trademark) or a style sheet language such as cascading style sheets (CSS). Note that a predetermined application delivered from the information providing device 10 or the SNS server 200 may be deemed as the control information.

The SNS server 200 illustrated in FIG. 1 is an information processing device which provides an SNS service and is realized by, for example, a server device, a cloud system, or the like. For example, when the SNS server 200 has received a post of a variety of pieces of information such as a text inputted by a user, an image (a still image or a moving image) shot by a user by using the terminal device 100, the SNS server 200 causes the pieces of information to be shared among users of the SNS by disclosing the received pieces of information.

Hereinafter, with reference to FIG. 1, the generation processing performed by the information providing device 10 will be described. Note that in the description below, an example in which the terminal device 101 is used by a user U1 and the terminal device 102 is used by a user U2 is shown. In addition, in the description below, there may be a case where the terminal device 101 is identified with the user U1 and the terminal device 102 is identified with the user U2. In other words, in the description below, the user U1 can also be read as the terminal device 101 and the user U2 can also be read as the terminal device 102.

First, the information providing device 10 receives a post of an image and a text from the user U1 (step S1). For example, the information providing device 10 receives an image C10 and a text T10 which the user U1 desires to post to the SNS service. Cited as a specific example is that the information providing device 10 receives the image C10 shot by the user U1 by using the terminal device 101 and the text T10 inputted by the user U1 as a caption of the image C10.

Subsequently, the information providing device 10 generates modified content in which visibility of a part of the image C10 is modified in accordance with a context which the text T10 indicates (step S2). For example, the information providing device 10 estimates a context corresponding to the image C10 from the text T10 and identifies objects corresponding to the context from the image C10 by employing any image recognition technology. Then, the information providing device 10 generates modified content C11 in which visibility of an area where the identified objects are not included is reduced. Cited as a specific example is that the information providing device 10 estimates, based on "Comment: I went on a date." which the text T10 indicates, a context "the date (in other words, sharing of an action with a specific person)" and generates the modified content C11 in which the visibility of the area, where the objects "persons" corresponding to the context are not included, of the image C10 is reduced.

Subsequently, the information providing device 10 posts the modified content C11 to the SNS server 200 (step S3). For example, the information providing device 10 posts the modified content C11 and the text T10 to the SNS server 200. Then, the SNS server 200 discloses the received pieces of information in the SNS service.

Subsequently, the information providing device 10 receives a post of an image and a text from the user U2 (step S4). For example, the information providing device 10 receives an image C20 and a text T20 which the user U2 desires to post to the SNS service. Cited as a specific example is that the information providing device 10 receives the image C20 shot by the user U2 by using the terminal device 102 and the text T20 inputted by the user U2 as a caption of the image C20.

Subsequently, the information providing device 10 generates modified content in which visibility of a part of the image C20 is modified in accordance with a context which the text T20 indicates (step S5). For example, the information providing device 10 estimates, based on "Comment: I went to see the art." which the text T20 indicates, a context "the art (in other words, an object other than persons" and generates modified content C21 in which visibility of an area, where objects "persons" are included, of the image C20 is reduced.

Subsequently, the information providing device 10 posts the modified content C21 to the SNS server 200 (step S6). For example, the information providing device 10 posts the modified content C21 and the text T20 to the SNS server 200. Then, the SNS server 200 discloses the received pieces of information in the SNS service.

Note that although in the example illustrated in FIG. 1, an example in which based on the context estimated from the text which each of the user's inputs, the information providing device 10 generates the modified content is shown, the generation processing realized by the information providing device 10 is not limited to the above-described example. For example, by using a generation model in which leaning is performed so as to generate (output) modified content based on an image shot by a user and a context which a text inputted by the user as a caption of the image indicates, the information providing device 10 may realize the generation processing. In addition, by using an evaluation model, the information providing device 10 may evaluate whether the modified content generated by the generation model matches the context which the caption of the image before modification indicates and may perform reinforcement learning of the generation model based on an evaluation result. Here, with reference to FIG. 2, the generation processing using the generation model and the reinforcement learning using the evaluation model will be described. FIG. 2 is a diagram illustrating one example of the processing using the generation model and the evaluation model according to an embodiment.

Note that in the description below, it is assumed that in the evaluation model, learning is performed so as to output higher evaluation when modified content which matches a context indicated by a caption of an image before modification (that is, a positive example) is inputted than evaluation made when modified content which does not match the context indicated by the caption of the image before the modification (that is, a negative example) is inputted.

As illustrated in FIG. 2, the information providing device 10 inputs an image C20 and a text T20 to the generation model and generates modified content C21. Then, the information providing device 10 inputs the text T20 and the modified content C21 to the evaluation model and evaluates whether the modified content C21 is content in which modification matching a context indicated by the text T20 is made.

Here, in an example in FIG. 2, when it is determined based on evaluation outputted by the evaluation model that the modified content C21 matches the context indicated by the text T20, the information providing device 10 sets positive reward as reward for generation of the modified content C21 and performs reinforcement learning of the generation model. On the other hands, when it is determined based on the evaluation outputted by the evaluation model that the modified content C21 does not match the context indicated by the text T20, the information providing device 10 sets negative reward as reward for generation of the modified content C21 and performs the reinforcement learning of the generation model.

As described above, the information providing device 10 according to an embodiment generates the modified content in which a part of the image is modified based on the context indicated by the text which a user inputs as to the image when a user posts the image to the SNS service. Thus, the information providing device 10 according to the embodiment can generate the modified content in which intention of image disclosure indicated in the text which a user inputs is reflected. In other words, the information providing device 10 according to the embodiment can generate appropriate content.

In addition, the information providing device 10 according to the embodiment performs the reinforcement learning of the generation model in which the modified content is generated based on the evaluation result obtained by evaluating whether or not the modified content matches the context indicated by the caption of the image before the modification. Thus, since the information providing device 10 according to the embodiment performs the reinforcement learning of the generation model so as to generate the appropriate modified content in which a user's intention of the image disclosure is reflected, the information providing device 10 can generate the modified content which has no feeling of strangeness for a user. In other words, the information providing device 10 according to the embodiment can generate appropriate content.

In addition, the information providing device 10 according to the embodiment acquires information of a real world (reality) as detection information detected by various sensors and constructs a detected world (sensed reality) from the acquired detection information. Then, the information providing device 10 provides a user, by various means, with a diminished world (diminished reality) in which targets, which satisfy predetermined conditions, among various targets included in the detected world (targets and correspondence in the real world) are erased or modified or easiness of recognition of the targets is reduced. As a result of this, the information providing device 10 according to the embodiment can exclude, from a user's recognition targets, pieces of information which a user does not want to recognize or to be recognized by users.

2. Configuration of Information Providing Device

Next, with reference to FIG. 3, a configuration of the information providing device 10 will be described. FIG. 3 is diagram illustrating a configuration example of the information providing device according to the embodiment. As illustrated in FIG. 3, the information providing device 10 includes a communication unit 20, a storage unit 30, and a control unit 40.

As to Communication Unit 20

The communication unit 20 is realized by, for example, a network interface card (NIC) or the like. The communication unit 20 is connected to the network N in a wired or wireless manner and transmits and receives information to and from the terminal device 100, the SNS server 200, and the like.

As to Storage Unit 30

The storage unit 30 is realized by, for example, a semiconductor memory element such as a random access memory (RAM) and a flash memory (Flash Memory), or a storage device such as a hard disk and an optical disk. As illustrated in FIG. 3, the storage unit 30 has a generation model database 31, an evaluation model database 32, and a learning data database 33.

As to Generation Model Database 31

The generation model database 31 has stored therein the generation model which generates, when content and a modification policy of the content are inputted, modified content in which a part of the content is modified in a modifying manner based on the modification policy.

As to Evaluation Model Database 32

The evaluation model database 32 has stored therein the evaluation model which evaluates, when the modified content and the modification policy of the content are inputted, whether modification of the modified content matching the modification policy is made.

As to Learning Data Database 33

The learning data database 33 has stored therein learning data used for learning of the evaluation model. Here, with reference to FIG. 4, one example of information which the learning data database 33 has stored therein will be described. FIG. 4 is a diagram illustrating one example of the learning data database according to an embodiment. In an example in FIG. 4, the learning data database 33 has items such as "learning data ID", "modified content", "modification policy", and "data kind".

The "learning data ID" indicates identification information for identifying the learning data. The "modified content" indicates modified content which is modified based on the modification policy. The "modification policy" indicates the modification policy used upon generating the modified content. The "data kind" indicates that the learning data is a kind of the positive example or the negative example.

In other words, in FIG. 4, an example in which in learning data identified by a learning data ID "P1", modified content "modified content #1" and a modification policy a "modification policy #1" are included and the kind of the learning data is the "positive example" is illustrated.

As to Control Unit 40

The control unit 40 is a controller and is realized, for example, by executing various programs stored in a storage device inside the information providing device 10 by a central processing unit (CPU), a micro processing unit (MPU), or the like with a RAM as a working area. In addition, the control unit 40 is a controller and is realized by, for example, an integrated circuit such as an application specific integrated circuit (ASIC) and a field programmable gate array (FPGA). As illustrated in FIG. 3, the control unit 40 according to an embodiment has a content acquisition unit 41, a modified content generation unit 42, a providing unit 43, an evaluation model learning unit 44, a modified content acquisition unit 45, an evaluation unit 46, and a generation model learning unit 47 and realizes or executes functions and action of the information processing described below.

As to Content Acquisition Unit 41

The content acquisition unit 41 acquires content targeted for disclosure and policy information indicating a disclosure policy of the content. For example, in the example in FIG. 1, the content acquisition unit 41 acquires the image C10 disclosed in the SNS service by the user U1 and the text T10 inputted in connection with the image C10 from the terminal device 101.

In addition, the content acquisition unit 41 may acquire the content and the policy information indicating the disclosure policy of the content from a user. For example, in the example in FIG. 1, the content acquisition unit 41 acquires the image C10 and the text T10 which the user U1 desires to post to the SNS service.

In addition, the content acquisition unit 41 may acquire an image as content and may acquire, as policy information, a text inputted by a user as a caption of the image. For example, in the example in FIG. 1, the content acquisition unit 41 acquires the image C10 shot by the user U1 by using the terminal device 101 and the text T10 inputted by the user U1 as the caption of the image C10.

In addition, the content acquisition unit 41 may acquire an action history of a user as the policy information. For example, the content acquisition unit 41 acquires the action history of a user in the SNS service provided by the SNS server 200 or various services or the like provided by other external server as the policy information.

As to Modified Content Generation Unit 42

The modified content generation unit 42 generates modified content in which a predetermined part of content is modified based on the disclosure policy indicated by the policy information. For example, in the example in FIG. 1, the modified content generation unit 42 generates the modified content C11, in which the visibility of the area corresponding to the information indicated by the text T10 is modified, of the image C10 based on the information indicated by the text T10.

In addition, the modified content generation unit 42 may estimate a context corresponding to content from a text and may generate modified content in accordance with the estimated context. For example, in the example in FIG. 1, the modified content generation unit 42 estimates, from the text T10, a context corresponding to the image C10 as the context "the date (in other words, sharing of an action with a specific person)" and generates the modified content C11 in which the visibility of the area, where the objects "persons" corresponding to the context are not included, of the image C10 is reduced.

In addition, the modified content generation unit 42 may generate modified content in which the content is modified in a manner varying in accordance with time based on the disclosure policy. For example, after generating the modified content, when the context (for example, a hobby and preference) indicated by the action history of the user has changed in accordance with a lapse of time, the modified content generation unit 42 modifies a predetermined part of the modified content based on a context after the change. When the description is given with reference to the example illustrated in FIG. 1, after generating the modified content C11, when a hobby and preference of the user U1 indicated by the action history has changed to "art", the modified content generation unit 42 generates a new modified content in which visibility of an area, where the objects "persons" are included is reduced, of the image C10.

In addition, the modified content generation unit 42 may generate modified content in which visibility of a predetermined spot is enhanced. For example, the modified content generation unit 42 generates modified content, in which visibility of a spot corresponding to a context of a user is enhanced, of the content.

In addition, the modified content generation unit 42 may generate modified content in which visibility of a spot other than a predetermined spot is reduced. For example, the modified content generation unit 42 generates modified content, in which visibility of a spot corresponding to a context of a user is reduced, of the content.

In addition, the modified content generation unit 42 may generate modified content in which visibility of a predetermined spot is reduced. For example, the modified content generation unit 42 generates modified content, in which visibility of a spot corresponding to a context of a user is reduced, of the content.

In addition, the modified content generation unit 42 may identify, based on the disclosure policy, an object, which is emphasized, from among objects included in content and may generate modified content in which the object is emphasized. For example, the modified content generation unit 42 identifies an object corresponding to the disclosure policy from content by using any image recognition technology. Then, the modified content generation unit 42 generates modified content in which visibility of the identified object is enhanced.

In addition, the modified content generation unit 42 may identify, based on the disclosure policy, an object, which is emphasized, from among objects included in content and may generate modified content in which visibility of an object other than the emphasized object is reduced. For example, in the example in FIG. 1, based on a context "the date (in other words, sharing of an action with a specific person)" of the image C10, estimated based on the text T10, the modified content generation unit 42 identifies objects "persons" corresponding to the context, of the image C10 and generates modified content C11 in which visibility of an area where the objects "persons" are not included is reduced.

In addition, in accordance with a context indicated by an action history of a user, which is acquired by the content acquisition unit 41, the modified content generation unit 42 may generate modified content in which a part of the content is modified. For example, in accordance with a context of demographic attributes, psychographic attributes, or the like, indicated by an action history of a user, the modified content generation unit 42 generates modified content in which a part of content which the user desires to disclose is modified. Cited as a specific example is that when a context (hobby) of a user is estimated to be "cooking" based on a post history in a web blog service, the modified content generation unit 42 generates modified content, in which an object corresponding to the context "cooking" is emphasized, of an image which the user desires to disclose in the web blog service or other service. In addition, when a context of a user is estimated to be "friends" based on a post history in the SNS service and the web blog service within a predetermined time period (for example, the most recent one month), the modified content generation unit 42 generates modified content, in which objects (for example, persons) corresponding to the context "friends" are emphasized, of an image which the user desires to disclose. In addition, when a context(hobby) of a user is estimated to be an "eating tour" based on a retrieval history or a history of browsed content, the modified content generation unit 42 generates modified content, in which an object (for example, cooking) corresponding to the context "eating tour" is emphasized, of an image which the user desires to disclose.

In addition, in accordance with a context indicated by sound, the modified content generation unit 42 may generate modified content in which a part of a moving image corresponding to the sound is modified. For example, when in multimedia including sound and a moving image, sound is modified to different sound, in accordance with a context indicated by the sound after the modification, the modified content generation unit 42 generates modified content in which a part of the moving image is modified. Cited as a specific example is that in the multimedia including the sound and the moving image, when an inappropriate statement of a person included in the moving image is modified to other sound, the modified content generation unit 42 generates modified content in which movement of a mouth made when the person gave the inappropriate statement is modified so as to correspond to the sound after the modification. In addition, when in the multimedia including the sound and the moving image, English sound of a person included in the moving image is dubbed to Japanese sound, the modified content generation unit 42 generates modified content in which movement of a mouth of the person is modified so as to correspond to the Japanese sound after the modification.

In addition, by using the generation model which generates modified content in which a part of content is modified in a modifying manner based on the modification policy, the modified content generation unit 42 may generate modified content. For example, in the example in FIG. 2, by using the generation model in which the learning is performed so as to generate modified content based on an image shot by a user and a context indicated by a text inputted by the user as a caption of the image, the modified content generation unit 42 generates modified content.

As to Providing Unit 43

The providing unit 43 provides the modified content generated by the modified content generation unit 42 for the information processing device which discloses the content. For example, in the example in FIG. 1, the providing unit 43 posts (provides) the generated modified content to the SNS server 200.

In addition, the providing unit 43 may provide the modified content and the policy information. For example, in the example in FIG. 1, the providing unit 43 posts the modified content C11 and the text T10 to the SNS server 200.

As to Evaluation Model Learning Unit 44

The evaluation model learning unit 44 performs learning of the evaluation model which evaluates whether inputted content is content which is modified so as to match an inputted modification policy. For example, the evaluation model learning unit 44 performs learning of the evaluation model by using the learning data stored in the learning data database 33. Cited as a specific example is that when the modification policy and the content which is modified so as to match the modification policy are inputted, the evaluation model learning unit 44 performs learning of the evaluation model so as to output higher evaluation than evaluation made when a modification policy and content which is modified so as not to match the modification policy are inputted.

Note that the learning data of the evaluation model may be created by, for example, collecting evaluation as to whether or not a context of an image matches a context of a text, the image and the text being in a combination, by means of crowdsourcing or the like, and the combination may be an image and a text of news and a title (caption) generated by manpower from content of the news.

As to Modified Content Acquisition Unit 45

The modified content acquisition unit 45 acquires modified content generated by the generation model which generates modified content in which a part of the content is modified in a modifying manner based on the modification policy (disclosure policy) and the modification policy used upon generating the modified content. For example, in the example in FIG. 2, the modified content acquisition unit 45 acquires the modified content C21 generated by inputting the image C20 and the text T20 to the generation model and the text T20.

In addition, when the modification policy and the content are inputted, the modified content acquisition unit 45 may acquire modified content generated by a model, as the generation model, in which learning is performed so as to generate modified content in which a part of the content is modified in accordance with a context indicated by the modification policy. For example, in the example in FIG. 2, the modified content acquisition unit 45 acquires the modified content generated by the generation model in which the learning is performed so as to generate the modified content based on the image shot by a user and the context indicated by the text inputted by the user as the caption of the image.

In addition, when sound and a moving image are inputted, the modified content acquisition unit 45 may acquire modified content generated by a model, as the generation model, in which learning is performed so as to generate modified content in which a part of the moving image is modified in accordance with a context indicated by the sound. For example, when in multimedia including sound and a moving image, when the sound is modified to different sound, the modified content acquisition unit 45 acquires modified content generated by the model in which the learning is performed so as to generate the modified content in which a part of the moving image is modified in accordance with the context indicated by the sound after the modification.

As to Evaluation Unit 46

By using the evaluation model which evaluates whether inputted content is content in which modification matching an inputted modification policy is made, the evaluation unit 46 evaluates whether modified content acquired by the modified content acquisition unit 45 is content in which modification matching the modification policy acquired by the modified content acquisition unit 45 is made. For example, in the example of FIG. 2, the evaluation unit 46 inputs the text T20 and the modified content C21 into the evaluation model, and evaluates whether the modified content C21 is the content that has been modified to match the text T20.

In addition, the evaluation unit 46 may use a model, as the evaluation model, which evaluates whether content is content in which modification matching a context based on a modification policy is made. For example, in the example in FIG. 2, the evaluation unit 46 inputs the text T20 and the modified content C21 to the evaluation model and evaluates whether the modified content C21 is content in which modification matching a context indicated by the text T20 is made.

In addition, when a modification policy and content in which modification matching the modification policy is made are inputted, the evaluation unit 46 may use a model, as the evaluation model, in which learning is performed so as to output higher evaluation than evaluation made when a modification policy and content in which modification not matching the modification policy is made are inputted. For example, in the example in FIG. 2, when modified content matching a context indicated by a caption of the image before modification is inputted, the evaluation unit 46 evaluates the modified content by using the evaluation model in which the learning is performed so as to output the higher evaluation than the evaluation made when the modified content not matching the context indicated by the caption of the image before the modification is inputted.

As to Generation Model Learning Unit 47

The generation model learning unit 47 performs reinforcement learning of the generation model based on an evaluation result obtained by the evaluation unit 46. For example, in the example in FIG. 2, the generation model learning unit 47 has determined that the modified content C21 matches the context indicated by the text T20, based on evaluation outputted by the evaluation model, the information providing device 10 sets positive reward as reward for generation of the modified content C21 and performs the reinforcement learning of the generation model. On the other hands, when it is determined based on the evaluation outputted by the evaluation model that the modified content C21 does not match the context indicated by the text T20, the information providing device 10 sets negative reward as reward for generation of the modified content C21 and performs the reinforcement learning of the generation model.

3. Flow of Generation Processing

With reference to FIG. 5, a procedure of the generation processing of the information providing device 10 according to the embodiment will be described. FIG. 5 is a flowchart illustrating one example of the procedure of the generation processing according to the embodiment.

As illustrated in FIG. 5, the information providing device 10 acquires content and a disclosure policy (step S101). Subsequently, based on a context of the disclosure policy, the information providing device 10 generates modified content in which a part of the content is modified (step S102). Subsequently, the information providing device 10 outputs the modified content (step S103), finishing the processing.

4. Flow of Learning Processing

With reference to FIG. 6, a procedure of learning processing of the information providing device 10 according to the embodiment will be described. FIG. 6 is a flowchart illustrating one example of the procedure of the learning processing according to an embodiment.

As illustrated in FIG. 6, the information providing device 10 acquires modified content and a disclosure policy (step S201). Subsequently, by using the evaluation model, the information providing device 10 evaluates the modified content based on the disclosure policy (step S202). Subsequently, based on the evaluation result, the information providing device 10 performs the reinforcement learning of the generation model which generates the modified content (step S203), finishing the processing.

5. Modified Example

The above-described embodiments are descried as examples, and a variety of modifications and applications can be made.

5-1. As to Disclosure Destination of Modified Content

Although in the above-described embodiments, the example in which the modified content generation unit 42 generates the modified content disclosed in the SNS service is shown, a function of the modified content generation unit 42 is not limited to the above-mentioned example, and the modified content generation unit 42 may generate modified content disclosed in a variety of services, in each of which information is shared among users. For example, the modified content generation unit 42 may generate modified content disclosed in a web blog service, a message service, e-mail, an electronic bulletin board, chatting, a post service, an upload service, a news delivery service, a video delivery service, or the like.

5-2. As to Emphasized Object

Although in the above-described embodiments, the example in which the modified content generation unit 42 generates the modified content in which the object corresponding to the disclosure policy is emphasized is shown, a function of the modified content generation unit 42 is not limited the above-mentioned example. For example, the modified content generation unit 42 may generate modified content in which the object corresponding to the disclosure policy and an object indicating a user are emphasized. With reference to the example illustrated in FIG. 1 to give the description, when the context indicated by the text T20 is estimated to be "art", the modified content generation unit 42 generates modified content in which visibility of an area, where the object corresponding to the context "art" and the object (person) indicating the user U2 are included, of the image C20 is reduced.

5-3. As to Learning of Generation Model

Although in the above-described embodiments, the example in which the generation model learning unit 47 performs the reinforcement learning of the generation model based on the evaluation result obtained by the evaluation unit 46 is shown, a function of the generation model learning unit 47 is not limited to the above-mentioned example. For example, for the learning performed by the generation model learning unit 47, a technology regarding learning without any teacher (cited as one example is generative adversarial networks (GAN)) may be used. Cited as a specific example is that the generation model learning unit 47 performs the learning of the generation model by learning without any teacher in which a group of images (for example, images posted on the SNS server 200) which is provided with a caption and modified content generated by the modified content generation unit 42 are used.

5-4. As to Evaluation of Modified Content

Although in the above-described embodiments, the example in which the evaluation unit 46 evaluates whether the modified content matches the context (modification policy) of the content before the modification is shown, the evaluation unit 46 may evaluate the modified content based on a variety of criteria. For example, when a manner in which an object image (of an original object) within the content before the modification is displayed is modified or when an image of the original object is modified to a different object image (updated object), the evaluation unit 46 may evaluate whether or not it is natural that the original object whose display manner is modified and the updated object are included in the content before the modification.

Cited as a specific example is that when the original object is blurred (in other words, visibility is reduced), the evaluation unit 46 evaluates whether or not a boundary between the original object and objects which are objects within the content before the modification and are located around the original object is natural (smooth). In other words, the evaluation unit 46 evaluates affinity between the original object (or the updated object) whose display manner is modified and the content before the modification.

In addition, when the content before the modification is a landscape image which includes sky, the evaluation unit 46 evaluates content, in which the original object indicating a "bird" within the content is modified to the updated object indicating "fish", as unnatural. In other words, the evaluation unit 46 evaluates whether or not a context of the content before the modification matches a context of the updated object.

In addition, when in the multimedia including the sound and the moving image, an inappropriate statement of a person, which is included in the sound, is modified to different sound, the evaluation unit 46 evaluates whether or not the modification has been made such that a moving image appearing when the person made the inappropriate statement matches a context of the sound after the modification. In other words, in the multimedia after the modification, the evaluation unit 46 evaluates consistency between the objects indicated by pieces of information. For example, when the inappropriate statement of the person, which is included in the sound, is modified to a roar of a bear, the evaluation unit 46 evaluates whether or not in the moving image appearing when the person made the inappropriate statement, the object indicating the person is modified to the bear.

Note that the generation model learning unit 47 may set positive reward as reward for generation of the modified content which the evaluation unit 46 evaluates as natural (in other words, the content before the modification matches a context of the updated object or in the multimedia after the modification, the objects indicated by the pieces of information match each other) and may perform the learning of the generation model. In addition, the generation model learning unit 47 may set negative reward as reward for generation of the modified content which the evaluation unit 46 evaluates as unnatural (in other words, the content before the modification does not match the context of the updated object or in the multimedia after the modification, the objects indicated by pieces of information do not match each other) and may perform the learning of the generation model.

5-5. As to Policy Information

Although in the above-described embodiment, the example in which the content acquisition unit 41 acquires the caption of the content (image) and the action history of a user as the policy information is shown, the policy information which the content acquisition unit 41 acquires is not limited to the above-described example. For example, the content acquisition unit 41 may acquire, as the policy information, information detected by various sensors (for example, a global positioning system (GPS) sensor) which the terminal device 100 has. Cited as a specific example is that the content acquisition unit 41 acquires, as the policy information, positional information indicating a spot where a user shoots the content or a spot where a user posts the content.

5-6. As to Processing Manners

Of manners of the processing described in the above-described embodiments, all or a part of the manners of the processing which are described as being automatically performed can be manually performed, or conversely, all or a part of the manners of the processing which are described as being manually performed can be automatically performed by employing the heretofore known method. Besides, pieces of information described and illustrated in the above description and the drawings, which include the processing procedures, the specific names, a variety of pieces of data, and parameters can be modified in any manner unless otherwise specified. For example, various pieces of information illustrated in the drawings are not limited to those illustrated in the drawings.

In addition, the components of the devices in the drawings are illustrated as functional conceptual ones and are not necessarily required to be configured physically as in the drawings. In other words, specific forms of dispersion and integration of the devices are not limited to those illustrated in the drawings, and in accordance with various loads, usage conditions, and the like, all or a part thereof can be configured by any unit by functionally or physically dispersing and integrating the devices.

In addition, the above-described embodiments can be appropriately combined in a range in which contradiction of the processing content is not caused.

6. Effects

As described above, the information providing device 10 according to the embodiment has the content acquisition unit 41, the modified content generation unit 42, the providing unit 43, the evaluation model learning unit 44, the modified content acquisition unit 45, the evaluation unit 46, and the generation model learning unit 47. The content acquisition unit 41 acquires content targeted for disclosure and policy information indicating a disclosure policy of the content. The modified content generation unit 42 generates modified content in which a predetermined part of content is modified based on the disclosure policy indicated by the policy information. The providing unit 43 provides the modified content generated by the modified content generation unit 42 for the information processing device which discloses the content. In addition, the providing unit 43 provides the modified content and the policy information. The evaluation model learning unit 44 performs learning of the evaluation model which evaluates whether inputted content is content which is modified so as to match an inputted modification policy. The modified content acquisition unit 45 acquires the modified content generated by the generation model which generates the modified content in which a part of the content is modified in the modifying manner based on the modification policy and the modification policy used upon generating the modified content. By using the evaluation model which evaluates whether inputted content is content in which modification matching an inputted modification policy is made, the evaluation unit 46 evaluates whether modified content acquired by the modified content acquisition unit 45 is content in which modification matching the modification policy acquired by the modified content acquisition unit 45 is made. The generation model learning unit 47 performs the learning of the generation model. In addition, the generation model learning unit 47 performs the reinforcement learning of the generation model based on the evaluation result obtained by the evaluation unit 46.

Thus, the information providing device 10 according to the embodiment can generate the modified content in which the intention of the content disclosure indicated in the text which a user inputs is reflected. In addition, since the information providing device 10 according to the embodiment performs the reinforcement learning of the generation model so as to generate the appropriate modified content in which the intention of the content disclosure of a user is reflected, the modified content which has no feeling of strangeness for a user can be generated. In other words, the information providing device 10 according to the embodiment can generate appropriate content.

In addition, in the information providing device 10 according to the embodiment, for example, the content acquisition unit 41 acquires the content and the policy information indicating the disclosure policy of the content from a user. In addition, the content acquisition unit 41 acquires, as the content, the image and acquires, as the policy information, the text which a user inputs as the caption of the image. In addition, the content acquisition unit 41 acquires, as the policy information, the action history of a user.

Thus, since the information providing device 10 according to the embodiment can generate the modified content, in which the intention of the content disclosure indicated in the text which a user inputs, is reflected based on the various pieces of information, the information providing device 10 can generate the appropriate content.

In addition, in the information providing device 10 according to the embodiment, for example, the modified content generation unit 42 estimates the context corresponding to the content from the text and generates the modified content in accordance with the estimated context. In addition, the modified content generation unit 42 generates the modified content in which the content is modified in the manner varying in accordance with time based on the disclosure policy. In addition, the modified content generation unit 42 generates the modified content in which the visibility of the predetermined spot is enhanced. In addition, the modified content generation unit 42 generates the modified content in which the visibility of the spot other than the predetermined spot is reduced. In addition, the modified content generation unit 42 generates the modified content in which the visibility of the predetermined spot is reduced. In addition, the modified content generation unit 42 identifies, based on the disclosure policy, the object, which is emphasized, from among the objects included in the content and generates the modified content in which the object is emphasized. In addition, the modified content generation unit 42 identifies, based on the disclosure policy, the object, which is emphasized, from among the objects included in the content and generates the modified content in which the visibility of the objects other than the above-mentioned object is reduced.

Thus, since the information providing device 10 according to the embodiment can generate the modified content in which the object corresponding to the intention of the content disclosure of a user is emphasized, the information providing device 10 can generate the appropriate content in which a user's intention is reflected.

In addition, in the information providing device 10 according to the embodiment, for example, the modified content acquisition unit 45 acquires the modified content generated by the model, as the generation model, in which the learning is performed so as to generate the modified content in which a part of the content is modified in accordance with the context indicated by the modification policy, when the modification policy and the content are inputted. In addition, when the sound and the moving image are inputted, the modified content acquisition unit 45 acquires the modified content generated by the model, as the generation model, in which the learning is performed so as to generate the modified content in which a part of the moving image is modified in accordance with the context indicated by the sound.

Thus, since the information providing device 10 according to the embodiment acquires the modified content generated by the generation model which generates the modified content in the various modifying manners and uses the modified content in the reinforcement learning, the appropriate content can be generated.

In addition, in the information providing device 10 according to the embodiment, for example, the evaluation unit 46 uses the model, as the evaluation model, which evaluates whether the content is the content in which the modification matching the context based on the modification policy is made. In addition, the evaluation unit 46 uses the model, as the evaluation model, in which the learning is performed so as to output the higher evaluation when the modification policy and the content in which the modification matching the modification policy is made are inputted than the evaluation made when the modification policy and the content in which the modification not matching the modification policy are inputted.

Thus, since the information providing device 10 according to the embodiment can perform the reinforcement learning of the generation model based on the evaluation result obtained by the evaluation model in which the appropriate learning is performed, the appropriate content can be generated.

7. Hardware Configuration

Figure 7:
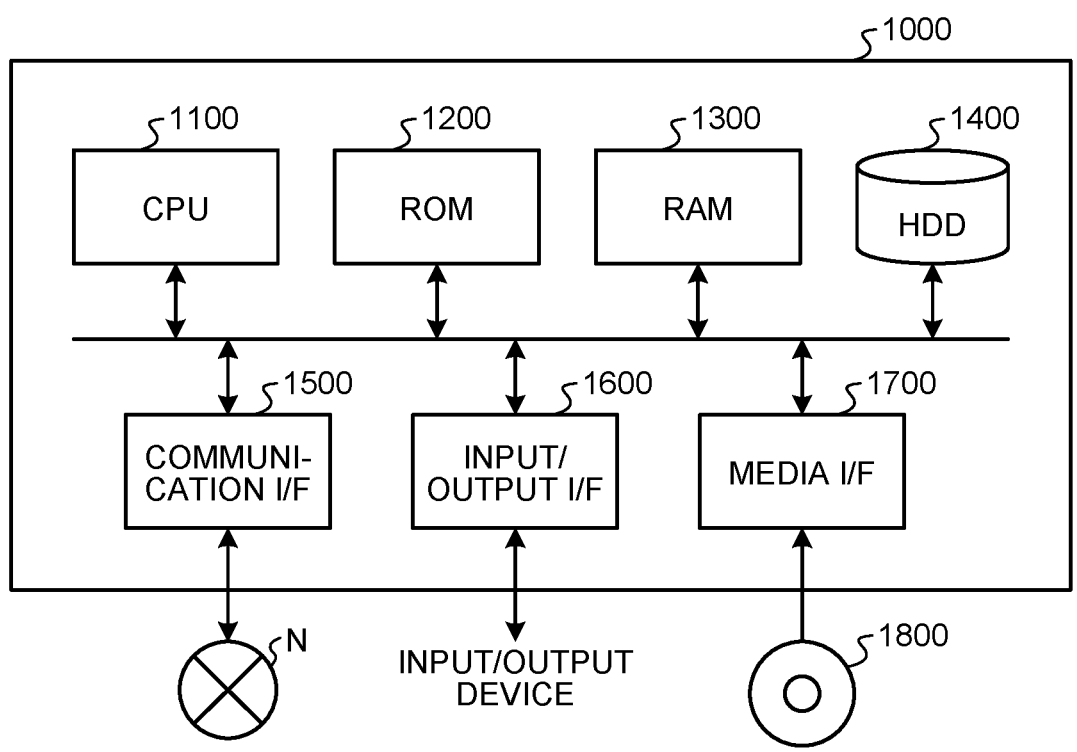
FIG. 7 is a hardware configuration diagram illustrating one example of a computer which realizes a function of the information providing device.

In addition, the information providing device 10 according to the above-described each embodiment is realized by, for example, a computer 1000 having a configuration illustrated in FIG. 7. Hereinafter, the information providing device 10 will be described as an example. FIG. 7 is a hardware configuration diagram illustrating one example of the computer which realizes functions of the information providing device. The computer 1000 has a CPU 1100, a ROM 1200, a RAM 1300, an HDD 1400, a communication interface (I/F) 1500, an input/output interface (I/F) 1600, and a media interface (I/F) 1700.

The CPU 1100 operates based on a program stored in the ROM 1200 or the HDD 1400 and performs control of components. The ROM 1200 has stored therein a boot program executed by the CPU 1100 upon booting the computer 1000, a program depending on hardware of the computer 1000, and the like.

The HDD 1400 has stored therein a program executed by the CPU 1100, data used by the program, and the like. The communication interface 1500 receives data from other apparatus via a communication network 500 (corresponding to network N in the embodiment) and transmits the data to the CPU 1100 and transmits data generated by the CPU 1100 via the communication network 500 to other apparatus.

The CPU 1100 controls output devices such as a display and a printer and input devices such as a keyboard and a mouse via the input/output interface 1600. The CPU 1100 acquires data from the input devices via the input/output interface 1600. In addition, the CPU 1100 outputs, to the output devices, data generated via the input/output interface 1600.

The media interface 1700 reads a program or data stored in a recording medium 1800 and provides the CPU 1100 with the read program or data via the RAM 1300. The CPU 1100 loads the above-mentioned program from the recording medium 1800 onto the RAM 1300 via the media interface 1700 and executes the loaded program. The recording medium 1800 is, for example, an optical recording medium such as a digital versatile disc (DVD) and a Phase change rewritable Disk (PD), a magneto-optical recording medium such as a Magneto-Optical disk (MO), a tape medium, a magnetic recording medium, a semiconductor memory, or the like.

For example, when the computer 1000 functions as the information providing device 10, the CPU 1100 of the computer 1000 executes the program loaded onto the RAM 1300, thereby realizing a function of the control unit 40. In addition, the HDD 1400 has stored therein pieces of data inside the storage device of the information providing device 10. Although the CPU 1100 of the computer 1000 reads these programs from the recording medium 1800 and executes these programs, as other example, the CPU 1100 may acquire these programs from other device via a predetermined communication network.

8. Others

Although hereinbefore, with reference to the drawings, several embodiments of the present application are described in detail, these are illustrated as examples, and the present invention can be implemented in other forms in which a variety of modifications and refinements are made based on the knowledge of those skilled in the art, as in the described aspects of the disclosure of the invention.

In addition, the configuration of the above-described information providing device 10 can be flexibly modified depending on functions thereof, and for example, an external platform or the like is called up by an application programming interface (API), network computing, or the like, thereby allowing the configuration of the information providing device 10 to be realized.

In addition, each of the "units" described in claims can be read as "means", a "circuit", or the like. For example, the content acquisition unit can be read as content acquisition means or a content acquisition circuit.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A generation device comprising:
   a processor configured to acquire content targeted for disclosure and policy information which indicates a disclosure policy of the content;
   the processor is further configured to generate modified content in which a predetermined part of the content is modified based on the disclosure policy indicated by the policy information;
   the processor is further configured to evaluate the modified content based on the disclosure policy to generate evaluation result; and
   the processor is further configured to perform reinforcement learning of a generation model based on the evaluation result, wherein
   if a moving image is acquired as the content, the content is modified based on a sound associated with the moving image to generate the modified content;
   the generation model is used by the processor to generate the modified content; and
   for a part of the sound is determined to be inappropriate based on the disclosure policy indicated by the policy information and being a part of a speech, the content is modified to modify the part of the sound to nonspeech.

2. The generation device according to claim 1, further comprising
   the processor is further configured to provide the modified content for an information processing device which discloses the content.

3. The generation device according to claim 2, wherein the processor is further configured to acquire the modified content and the policy information.

4. The generation device according to claim 1, wherein the processor is further configured to acquire, from a user, the content and the policy information which indicates the disclosure policy of the content.

5. The generation device according to claim 1, wherein the processor is further configured to acquire an image as the content and acquires a text which a user inputs as a caption of the image as the policy information.

6. The generation device according to claim 5, wherein the processor is further configured to estimate a context corresponding to the content from the text and generates the modified content in accordance with the estimated context.

7. The generation device according to claim 1, wherein the processor is further configured to acquire an action history of a user as the policy information.

8. The generation device according to claim 1, wherein the processor is further configured to generate the modified content in which the content is modified in a manner varying in accordance with time based on the disclosure policy.

9. The generation device according to claim 1, wherein the processor is further configured to generate the modified content in which visibility of a predetermined spot is enhanced.

10. The generation device according to claim 1, wherein the processor is further configured to generate the modified content in which visibility of a spot other than a predetermined spot is reduced.

11. The generation device according to claim 1, wherein the processor is further configured to generate the modified content in which visibility of a predetermined spot is reduced.

12. The generation device according to claim 1, wherein the processor is further configured to identify, based on the disclosure policy, an object, which is emphasized, from among objects included in the content and generates the modified content in which the object is emphasized.

13. The generation device according to claim 1, wherein the processor is further configured to identify, based on the disclosure policy, an object, which is emphasized, from among the objects included in the content and generates the modified content in which visibility of the objects other than the object is reduced.

14. A generation method which a computer executes, the method comprising:
    an acquisition step of acquiring content targeted for disclosure and policy information which indicates a disclosure policy of the content;
    a generation step of generating modified content in which a predetermined part of the content is modified based on the disclosure policy indicated by the policy information;
    an evaluation step of evaluating the modified content based on the disclosure policy to generate evaluation result; and
    a generation model learning step of performing reinforcement learning of a generation model based on the evaluation result, wherein
    the generation model is used by the generation step to generate the modified content;
    the evaluation step is performed using an evaluation model, wherein the evaluation model determines whether the modified content matches a context corresponding to the content, and the reinforcement learning of the generation model is performed when the modified content matches the context corresponding to the content;

if a moving image is acquired as the content, the content is modified based on a sound associated with the moving image to generate the modified content; and if the sound is determined to be in a first language, the sound is modified to dub in a second language and the moving image is modified to correspond to a speech speed of the modified sound.

15. A non-transitory computer readable storage medium having stored therein a generation program which causes a computer to execute:

an acquisition procedure of acquiring content targeted for disclosure and policy information which indicates a disclosure policy of the content;

a generation procedure of generating modified content in which a predetermined part of the content is modified based on the disclosure policy indicated by the policy information;

an evaluation procedure of evaluating the modified content based on the disclosure policy to generate evaluation result; and a generation model learning procedure of performing reinforcement learning of a generation model based on the evaluation result, wherein:

the generation model is used by the generation procedure to generate the modified content;

the evaluation procedure is performed using an evaluation model, wherein the evaluation model determines whether the modified content matches a context corresponding to the content, and the reinforcement learning of the generation model is performed when the modified content matches the context corresponding to the content;

if a moving image is acquired as the content, the content is modified based on a sound associated with the moving image to generate the modified content;

if the sound is determined to be in a first language, the sound is modified to dub in a second language and the moving image is modified to correspond to a speech speed of the modified sound; and if a part of the sound is determined to be inappropriate based on the disclosure policy indicated by the policy information, the content is modified to modify the part of the sound and a part of the moving image associated with the part of the sound.

* * * * *